United States Patent [19]

Cote

[11] 4,408,154

[45] Oct. 4, 1983

[54] DUAL VOLTAGE POWER SUPPLY WITH INPUT FILTER

[75] Inventor: Paul T. Coté, Cleveland Heights, Ohio

[73] Assignee: General Electric Company, Schenectady, N.Y.

[21] Appl. No.: 298,833

[22] Filed: Sep. 2, 1981

[51] Int. Cl.³ .............................................. H02M 1/12
[52] U.S. Cl. ..................................... 323/340; 307/75; 315/173; 315/243; 315/283; 363/44; 363/143
[58] Field of Search ....................... 307/21, 23, 25, 28, 307/64, 75, 150, 157; 315/173, 175, 176, 232, 239, 243, 254, 258, 276, 278, 283, 288; 323/247, 855, 293, 299, 301, 305, 328, 340, 355; 363/39, 44-47, 142, 143

[56] References Cited

U.S. PATENT DOCUMENTS

| 3,397,355 | 8/1968 | Frank | 323/301 |
| 3,683,271 | 8/1972 | Kobayashi | 323/355 |
| 3,780,342 | 12/1973 | Grimshaw et al. | 315/173 |
| 4,109,307 | 8/1978 | Knoll | 363/101 |
| 4,188,661 | 2/1980 | Bower et al. | 363/49 |

Primary Examiner—A. D. Pellinen
Attorney, Agent, or Firm—John F. McDevitt; Philip L. Schlamp; Fred Jacob

[57] ABSTRACT

A dual voltage power supply, for example operable from 120 and 240 volts a-c and having three voltage input terminals, is provided with an input filter having three windings on a core and inductively coupled together, the three windings being connected respectively to the three input terminals. Filter capacitors are connected to the windings.

5 Claims, 2 Drawing Figures

DUAL VOLTAGE POWER SUPPLY WITH INPUT FILTER

BACKGROUND OF THE INVENTION

The invention is in the field of dual voltage power supplies, and input filters for suppressing electrical transients and reducing electromagnetic radiation (radio interference).

Power supplies operating from a-c current are desirably provided with input filters. For example, U.S. Pat. No. 4,188,661 to Bower and Kohler discloses an electronic ballast circuit for operating fluorescent lamps from a source of a-c electrical power; an input filter has two windings on a common core. U.S. Pat. No. 4,109,307 to Knoll discloses a lamp ballast circuit having an input filter with two windings on separate cores. FIG. 1 of the present drawing illustrates a prior-art dual voltage power supply having an input filter connected ahead of a voltage selection switch. In certain devices, for example movie projectors having an arc discharge lamp operated by a dual voltage power supply, it is desirable to locate the input filter in the power supply unit and electrically after the voltage selection switch, thus requiring two input filters, i.e. one in the 120 volt input line and another in the 240 volt input line.

SUMMARY OF THE INVENTION

Objects of the invention are to provide a dual-voltage power supply with an input filter located electrically after the voltage selector means and which is economical and effective.

The invention comprises, briefly and in a preferred embodiment, a dual voltage power supply circuit having a three terminal input voltage means comprising a common terminal and terminals for two differing voltages, in which the improvement comprises an input filter having three windings on a common core, one of the three windings being connected between the common input terminals and a power line terminal and the other two windings being respectively connected between the other two input terminals and output terminals of a voltage selector switch. Filter capacitors are connected between filter windings and/or to electrical ground. In a preferred embodiment the power supply circuit functions to operate a lamp of the arc or discharge type.

DESCRIPTION OF THE PRIOR ART

Figure 1:
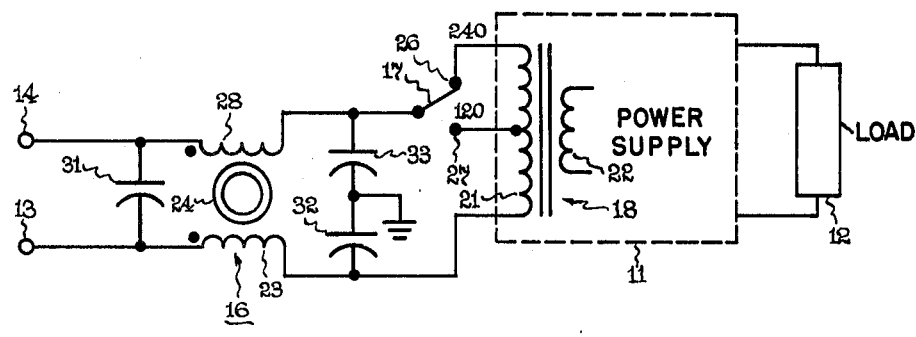
FIG. 1 is an electrical schematic drawing, partly in block form, of a prior art dual voltage power supply having an input filter.

FIG. 1 (prior art) shows a power supply 11 or ballast circuit connected to operate a load 12 such as an arc or discharge lamp. A pair of input power terminals 13, 14 are provided for connection to an available or desired source of power, such as 120 volts or 240 volts a-c. An input filter 16 and a voltage selector 17 such as a switch are connected between the input power terminals 13, 14 and a three-terminal input means 18 in the power supply 11, which means 18 may be a transformer having primary and secondary windings 21 and 22. The secondary winding 22 may be connected to rectifiers which provide d-c voltage for operating a ballast circuit, such as is disclosed in the above-referenced patents and incorporated in this disclosure by reference thereto.

An end of the primary winding 21 is connected to the power terminal 13 via a winding 23 on a core 24 in the filter 16. The other end of the primary winding 21 is connected to a terminal 26 for 240 volts input, and a center tap of the primary winding 21 is connected to a terminal 27 for 120 volts input. The switch 17 selectively connects the power terminal 14, via a winding 28 on the core 24 of filter 16, to one or the other terminals 26, 27 in accordance with whether the line input voltage at terminals 13, 14 is 240 volts or 120 volts. The input filter 16 includes a capacitor 31 connected across the filter input and capacitors 32, 33 connecting the filter output to electrical ground.

Windings 23 and 28, are polarized as indicated, so that the magnetic flux lines, set up in core 24 by the main supply current, will cancel each other. This prevents saturation of core 24 so that filter 16 in combination with capacitors 32 and 33 can effectively attenuate common mode noise currents.

DESCRIPTION OF THE PREFERRED EMBODIMENT

Figure 2:
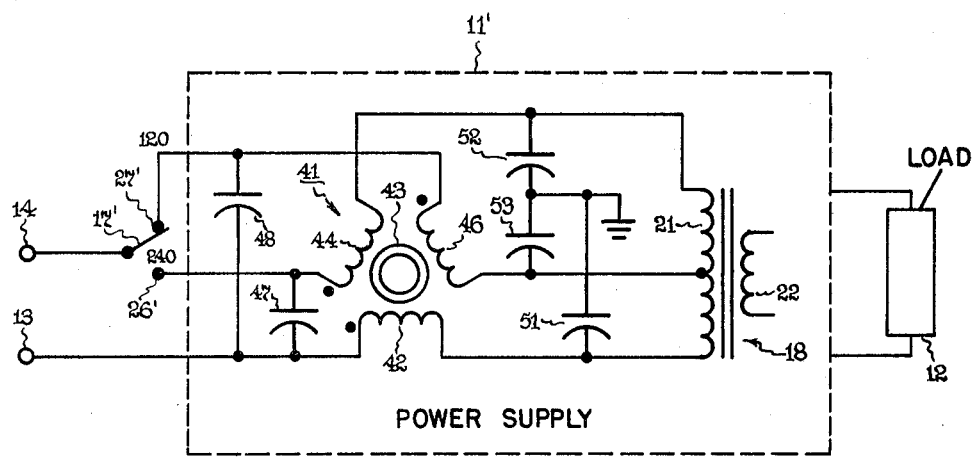
FIG. 2 is an electrical schematic drawing, partly in block form, of a preferred embodiment of the invention.

As is shown in FIG. 2, the voltage selector switch 17' is connected to power input terminal 14 and thus can be physically located at a convenient location away from or remotely from the power supply and its input filter, and the input filter can be included in the power supply unit without the need for wiring an intervening switch between the filter and the power supply. The input filter 41 comprises a first winding 42 on a core 43 and connected between an end of the primary winding 21 and the common power terminal 13, a second winding 44 on the core 43 and connected between the other end of primary winding 21 and the switch terminal 26' for 240 volts, and a third winding 46 on the core 43 and connected between a center tap of the primary winding 21 and the switch terminal 27' for 120 volts. Capacitors 47 and 48 are respectively connected between the current input ends of filter windings 44, 46 and the current input end of the common filter winding 42, and capacitors 51, 52, and 53 are respectively connected between the current output ends of filter windings 42, 44 46 and electrical ground. The windings 42, 44, and 46 may be toroidal windings of several turns on an annular ferrite core. The capacitors 47, 48 may each be 0.6 microfarads and capacitors 51, 52, 53 may each be 0.002 microfarads.

The remainder of the power supply 11' between secondary winding 22 and the load 12, may for example comprise a rectifier d-c supply and a ballasting circuit such as are disclosed in the above-referenced patents which are particularly suitable if the load 12 is one or more fluorescent lamps, or may comprise a circuit such as is disclosed in U.S. Pat. No. 3,780,342 to Grinshaw and West, incorporated herein by reference thereto, and particularly suitable if the load 12 is an arc lamp for a projector such as a movie projector. The three-terminal voltage input means 18 need not be a transformer, and instead can be an arrangement of diodes or resistors.

Windings 44 and 46 are wound to have the same polarity, and winding 42 is wound to have the opposite polarity of windings 44 and 46, so as to prevent core saturation and to more effectively attenuate undesired noise and transient currents; whichever of the dual input voltages is used, the winding 44 or 46 which is active in the circuit will be polarized oppositely to the common winding 42.

As is evident from the foregoing, the invention provides an economical input filter, and improves the versatility of dual voltage power supplies by connecting the input voltage selector means such as a switch, jumper plug, or hand-wired connection, ahead of the input filter so that it can be conveniently located away from the power supply circuit.

While preferred embodiments and modifications of the invention have been shown and described, various other embodiments and modifications thereof will become apparent to persons skilled in the art and will fall within the scope of the invention as defined in the following claims.

What I claim as new and desire to secure by U.S. Letters Patent is:

1. A filtered dual voltage power supply for receiving power from a single phase alternating current line having two terminals, comprising a three terminal input voltage means comprising a common input terminal and input terminals for two differing voltages, in which the improvement comprises a voltage selector means connected to a first one of said line terminals and having two output terminals, and an input filter having three windings on a common core, a first one of said windings being connected between said common terminal and the second one of said line terminals, and the second and third of said windings being respectively connected between said input terminals for differing voltages and said output terminals of the voltage selector means, said connection of the voltage selector means to the line terminal thereby preceding connection of the input filter thereto.

2. A power supply as claimed in claim 1, in which said three windings are toroidal windings on an annular core.

3. A power supply as claimed in claim 1, including capacitors respectively connected between the current input ends of said second and third windings and the current input end of said first winding, and further including capacitors respectively connected between the current outout ends of said three windings and electrical ground.

4. A power supply as claimed in claim 1 in which said voltage selector means is a switch.

5. A power supply as claimed in claim 1, in which said second and third windings are wound with the same polarity and said first winding is wound with a polarity opposite to that of said second and third windings.

* * * * *